United States Patent [19]

Frampton et al.

[11] 4,429,892
[45] Feb. 7, 1984

[54] SLIDING FIFTH WHEEL

[76] Inventors: William H. Frampton, 17119 Clarkdale, Artesia, Calif. 90701; Alfred M. Bos, 10123 Palm St., Bellflower, Calif. 90706

[21] Appl. No.: 277,247

[22] Filed: Jun. 25, 1981

[51] Int. Cl.³ .............................................. B62D 53/08
[52] U.S. Cl. ................................. 280/407; 280/438 R
[58] Field of Search ............... 280/407, 405 A, 438 R, 280/468, 80 B, 81 R

[56] References Cited

U.S. PATENT DOCUMENTS

| | | | |
|---|---|---|---|
| 2,776,846 | 1/1957 | Willock | 280/407 |
| 2,807,477 | 9/1957 | Tuso, Jr. | 280/407 |
| 2,835,504 | 5/1958 | Acker | 280/405 A X |
| 2,860,891 | 11/1958 | Ramun | 280/407 |
| 2,940,774 | 6/1960 | Buvelot | 280/405 A |
| 3,112,936 | 12/1963 | Cole et al. | 280/407 |
| 3,170,716 | 2/1965 | Walther et al. | 280/407 |

FOREIGN PATENT DOCUMENTS

| | | | |
|---|---|---|---|
| 624175 | 7/1961 | Canada | 280/405 A |
| 1925831 | 11/1970 | Fed. Rep. of Germany | 280/438 R |

Primary Examiner—Joseph F. Peters, Jr.
Assistant Examiner—Mitchell J. Hill
Attorney, Agent, or Firm—Edgar W. Averill, Jr.

[57] ABSTRACT

A device for attachment to a tractor for selectively moving the fifth wheel assembly of the tractor. The device has two drive members which are affixed to the frame of the tractor at one end and to the fifth wheel platform at the other end. The drive members may be extended or contracted from the cab of the tractor to cause the fifth wheel platform to slide.

6 Claims, 7 Drawing Figures

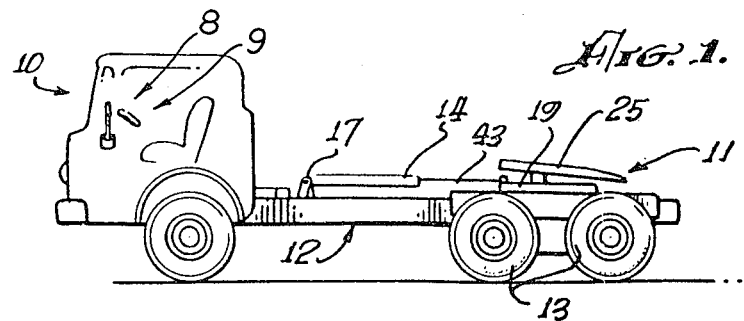
FIG. 1.
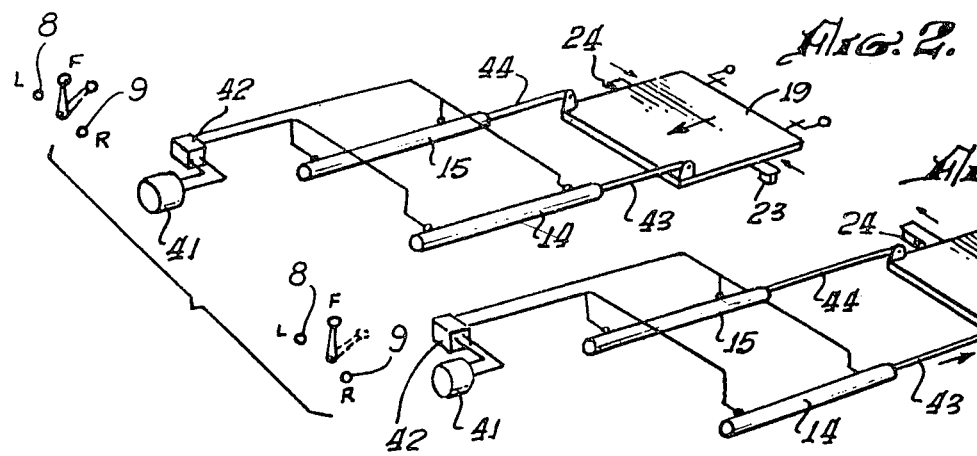
FIG. 2.
FIG. 3.
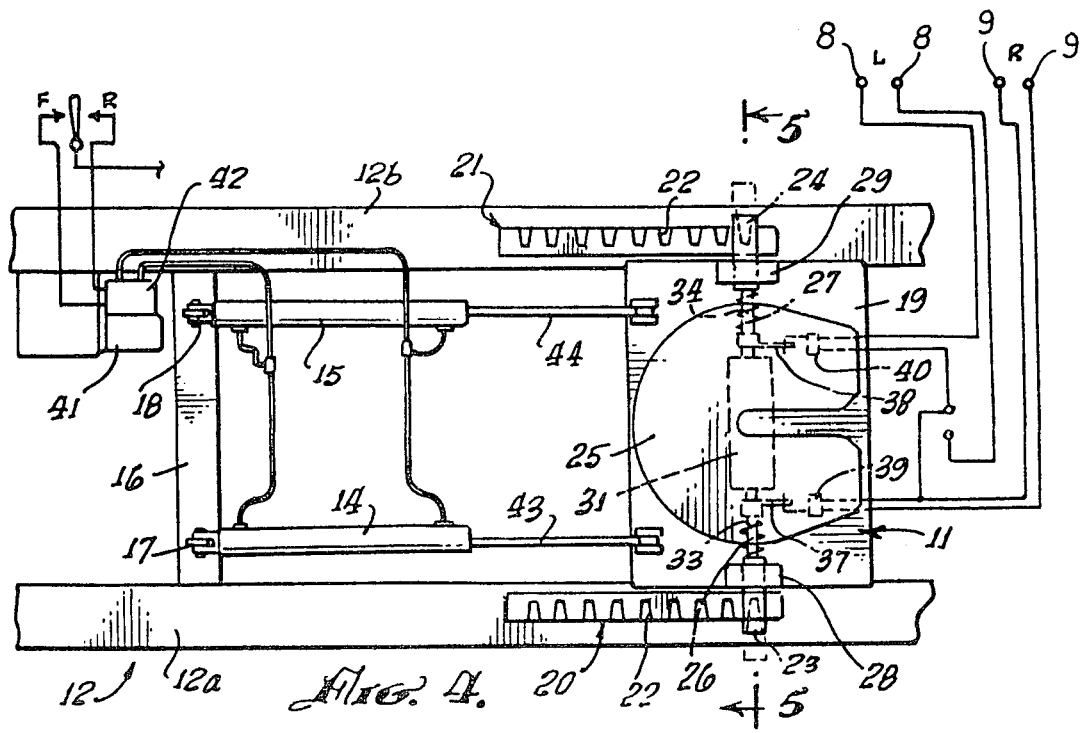
FIG. 4.

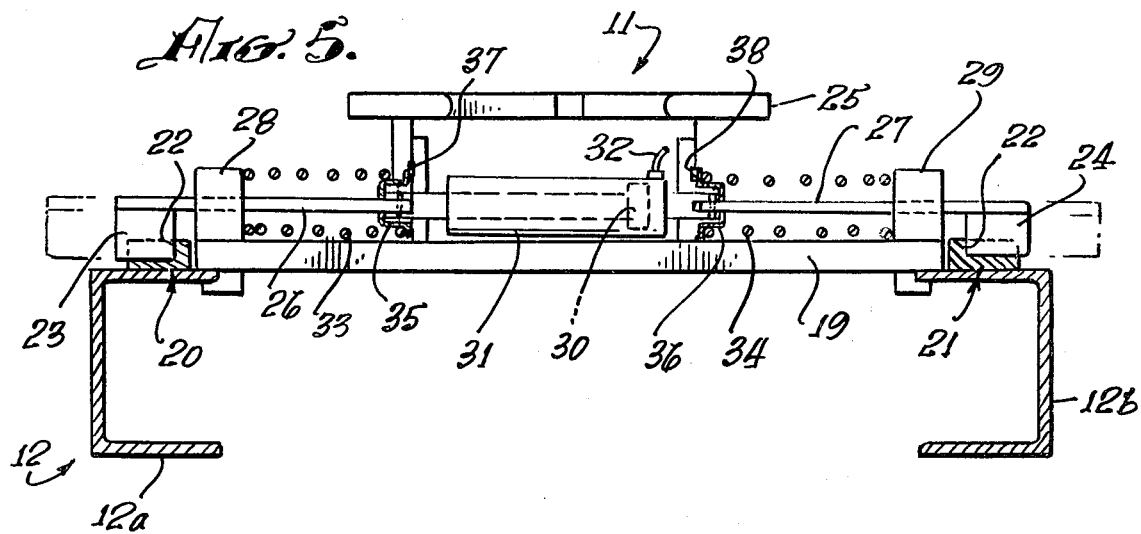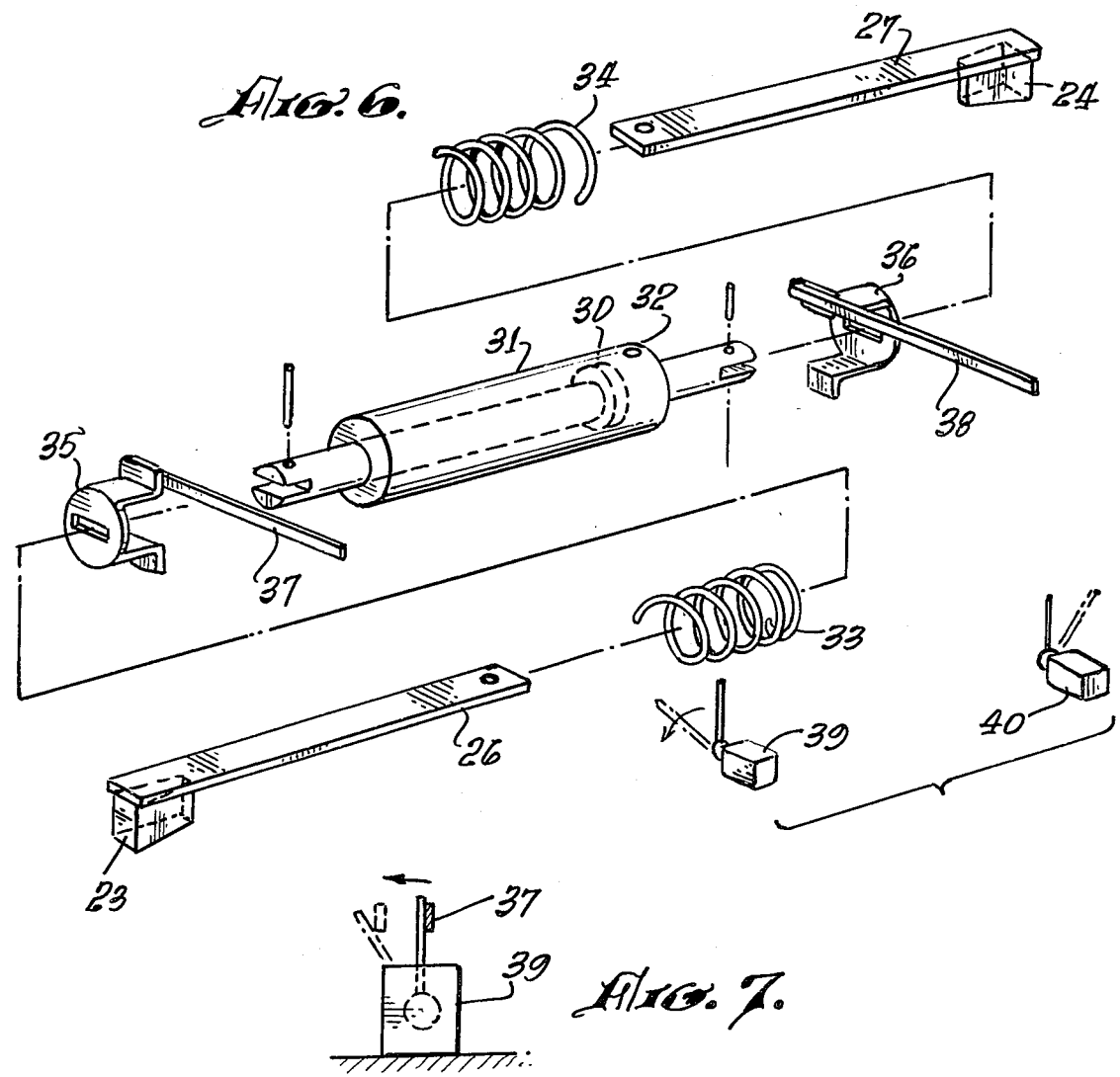

SLIDING FIFTH WHEEL

BACKGROUND OF THE DISCLOSURE

Many tractors are equipped with fifth wheel assemblies which may be locked in different positions with respect to the tractor to distribute the load from the trailer at different points along the tractor frame. Load distribution is important not only for the handling of the tractor trailer rig, but is also important for axle loading limits which vary between different states. The usual method of repositioning the fifth wheel was for the driver to unlock the locking mechanism of the fifth wheel, lock the wheels of the trailer and drive the tractor forward and back thereby moving the fifth wheel with respect to the tractor frame followed by locking the fifth wheel in a new position. This required the driver to leave the tractor to unlock the fifth wheel and also to lock the fifth wheel in its new position. It also required the trailer wheels to be locked during this moving operation. Furthermore, the exact amount of movement of the fifth wheel was depended upon the distance that the tractor was moved and was therefore inherently inexact.

Various other attempts have been made to provide adjustable fifth wheel assemblies but these devices have required elaborate and expensive replacement of the existing fifth wheel mounting assembly and generally have not permitted the movement of the fifth wheel without the locking of the trailer wheels. Various fifth wheel mounting and moving devices are shown in the following U.S. Pat. Nos.: 2,807,477; 3,170,716; 3,181,889 and 3,391,948.

The devices shown in the above-listed patents have not permitted the economical modification of existing fifth wheels, and there is a need for a relatively inexpensive, easily operated device for attachment to existing fifth wheel asemblies to facilitate the movement of the fifth wheel assembly with the respect to the tractor frame.

SUMMARY OF THE INVENTION

It is an object of the present invention to provide a device for attachment to existing fifth wheel assemblies to facilitate the sliding movement of the fifth wheel assembly with respect to the tractor. The present invention is for a device for attachment to a tractor for selectively moving the fifth wheel aseembly with respect to the drive wheels of the tractor. The tractor has an existing frame including two side rails, each side having a guide member which holds one side of a fifth wheel platform in a manner which allows longitudinal movement of the platform. The guide members have locking means to hold the fifth wheel platform in a fixed position with respect to the tractor frame. A first drive member is affixed at one end to a cross member held by the two side rails and at the other end of the fifth wheel platform. A second drive member is also affixed at one end to a cross member held by the two side rails and to the fifth wheel platform at the other end. Means are provided for selectively extending or contracting the first and second drive members which means for extending and contracting are operated from within the cab of the tractor. Indicator means are located in the cab of the tractor to indicate when the locking means of the fifth wheel assembly are locked or unlocked whereby the operator may unlock the fifth wheel assembly from the cab, move the fifth wheel platform to the desired position and lock the fifth wheel assembly in the new desired position all without leaving the cab and without locking the wheels of the trailer.

BRIEF DESCRIPTION OF THE DRAWINGS

FIG. 1 is a side view of the tractor and fifth wheel assembly used in conjunction with the device of the present invention.

FIG. 2 is a perspective schematic view showing the device of the present invention in a first position.

FIG. 3 is a prspective schematic view of the device of the present invention in a second position.

FIG. 4 is a top plan view of the device of the present invention.

FIG. 5 is a cross-sectional view taken along line 5—5 of FIG. 4.

FIG. 6 is an exploded perspective view of the view of the fifth wheel unlocking and indicator switch assembly of th device of the present invention.

FIG. 7 is a side view of the switch of the assembly of FIG. 6.

DESCRIPTION OF THE PREFERRED EMBODIMENTS

A tractor having a cab 10 of fifth wheel assembly 11 affixed to a frame 12 is shown in side view in FIG. 1. The tractor drive wheels 13 are also held by frame 12 in a conventional manner. A pair of hydraulic cylinders 14 and 15 are held to a cross member 16 by a pair of ears 17 and 18. The hydraulic cylinders are pinned to ears 17 and 18 to permit a small amount of movement between the cylinders and the ears. The other end of each hydraulic cylinder is pinned to holding members affixed to the platform 19 of the fifth wheel assembly 11. Platform 19 is slideably affixed to the frame by two guide members 20 and 21 which have a plurality of notches 22. The fifth wheel 25 is conventionally mounted on platform 19.

The details of the locking and unlocking device are shown best in FIGS. 5 through 7 where the individual side rails 12a and 12b of frame 12 are shown in cross-sectional view. The tapered lock lugs 23 and 24 are affixed to lock bars 26 and 27. Lock bars 26 and 27 are in turn held by guide channels 28 and 29 which are welded to platform 19. An air operated piston 30 is held in a cylinder 31 and causes lock bars 26 and 27 to move outwardly when air is pumped into piston 31 through air line 32. When the air is released, spring 33 and 34 move the lock bars and lock lugs inwardly forcing the locking lugs into notches 22. U-shaped spring retainers 35 and 36 surround lock bars 27 and 26. An arm 37 is welded to spring retainer 35 and similarly arm 38 is welded to spring retainer 36. These arms contact a pair of switches 39 and 40 when the piston 30 is extended outwardly from cylinder 31 to indicate that the lock lugs 23 and 24 have been moved outwardly and away from notches 22. Switches 39 and 40 are connected to indicator lights in the tractor cab to show that both lock lugs are in the open position and the fifth wheel platform is ready for moving.

In order to move the fifth wheel platform, air is passed through line 32 into cylinder 31 opening lock lugs 23 and 24 (see FIG. 3). When both lugs are opened, switches 39 and 40 are closed turning on indicator lights 8 and 9 in the cab. After the indicator lights have been turned on, the operator then initiates the hydraulic fluid pump (see FIGS. 2 through 4) and the valve 42 causing the piston arms 43 and 44 to move inwardly or outwardly thereby moving platform 19 with respect to frame 12. When the platform 19 has been moved to the desired position, the ear on cylinder 31 is released moving lock lugs 23 and 24 inwardly into notches to indicate the position of the lock lugs and thus the position of platform 19.

The device of the present invention may be used on fifth wheel assemblies made by many different manufacturers. The particular configuration of fifth wheel mounting hardware shown in the present drawings is illustrative of the type commonly used, but other locking means and sliding apparatuses may also be used in conjunction with the drive members and indicator lights of the present invention. The important attribute of the present invention is its ability to be added to an existing fifth wheel assembly without the necessity of modifying the normal locking and moving features of the existing assembly. Thus, it is not necessary for the owner of a tractor to purchase an entirely new fifth wheel mounting assembly, but he need only add the cross member and drive members together with the various indicating switches to create a fifth wheel moving device which may be operated without locking the wheels of the trailer and entirely from the cab of the tractor. It would be possible for the device of the present invention to move the fifth wheel even while the tractor and trailer were being moved down the road. Because of the positive action of the drive members, the fifth wheel assembly may even be moved in situations where the fifth wheel assembly is improperly lubricated and the lubrication has become dry since it is a very positive and direct drive assembly for the fifth wheel platform.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

What is claimed is:

1. A device for attachment to a tractor for selectively moving the fifth wheel assembly with respect to the drive wheel of the tractor, said tractor having a frame including a cross member, two side rails, each side rail having a guide member which holds one side of a fifth wheel platform in a manner which allows longitudinal movement of the platform, the guide members also having locking means, said device comprising:

a first drive member affixed at one end to said cross member held by the two side rails and at the other end to the fifth wheel platform;

a second drive member affixed at one end to a cross member held by the two side rails and at the other end to the fifth wheel platform;

means for selectively extending or contracting the first and second drive members, said means for extending or contracting having activating means located in the cab of the tractor rig; and locking means affixed to said fifth wheel platform and to the side rails of the tractor comprising a first row of lock notches affixed to one of the side rails of the tractor frame and a second row of lock notches affixed to the other of the two side rails of the tractor frame and a pair lock lug means affixed to lock bars which lock lug means are moveable between a first position in which each lock lug is held by at least one of the lock notches in each of the rows and a second position where the lock lugs are disengaged from any of the lock notches in both rows; and indicator means located in the cab of the tractor to indicate when said locking means of the fifth wheel assembly are in a locked or unlocked configuration, whereby the operator may unlock the fifth wheel assembly, activate the first and second drive members to cause the drive members to extend or contract and cause the platform to slide with respect to the drive wheel and lock the fifth wheel assembly without leaving the cab of the tractor and without locking the wheels of the trailer.

2. The device of claim 1 wherein the first and second drive members are hydraulically operated and said means for selectively extending or contracting comprise a hydraulic pump, reservoir and valves.

3. The device of claim 1 wherein said indicator means comprise at least one indicator light controlled by switch means held by the fifth wheel platform.

4. The device of claim 1 wherein the first and second drive members are mounted parallel to the side rails.

5. The device of claim 1 wherein the indicator means comprises a pair of switches and switch activating arms affixed to the lock bars of the fifth wheel locking assembly, said switches being mounted so that the switches are closed when the lock bars are in an unlocked position.

6. The device of claim 1 further including switch means located in the locking notches of the guide members and indicator lights located in the cab of the tractor so that the position of the fifth wheel may be determined from within the cab.

* * * * *